Dec. 8, 1964  JAMES E. WEBB ADMINISTRATOR OF  3,159,967
THE NATIONAL AERONAUTICS AND
SPACE ADMINISTRATION
VARIABLE THRUST ION ENGINE UTILIZING THERMALLY
DECOMPOSABLE SOLID FUEL
Filed March 12, 1963
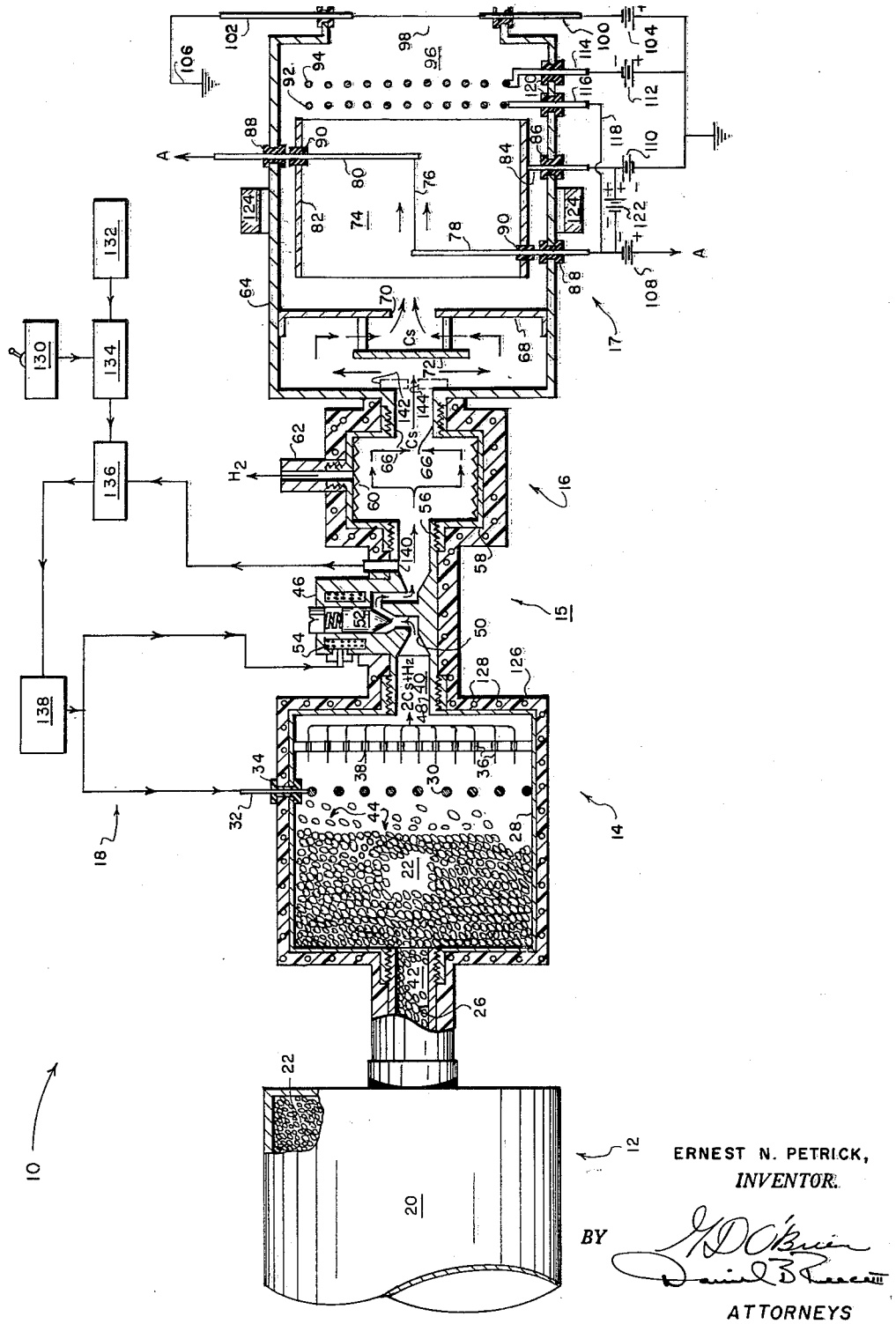
ERNEST N. PETRICK,
*INVENTOR*.
BY
*ATTORNEYS*

3,159,967
VARIABLE THRUST ION ENGINE UTILIZING THERMALLY DECOMPOSABLE SOLID FUEL
James E. Webb, Administrator of the National Aeronautics and Space Administration, with respect to an invention of Ernest N. Petrick
Filed Mar. 12, 1963, Ser. No. 264,736
24 Claims. (Cl. 60—35.5)

The invention described herein may be manufactured and used by or for the Government of the United States of America for governmental purposes without the payment of any royalties thereon or therefor.

This invention relates to an ion engine and the method of producing the ionizable fuel required to operate such engines. More particularly, this invention relates to a variable thrust ion engine having a fuel feed system that is capable of instantaneous response to a command signal, can be cycled repeatedly through off-on operating states, and to the method of producing and filtering an ionizable vapor fuel from a solid fuel containing compound.

With the realization of long space voyages and the exploration of various celestial bodies imminent, a great amount of interest and research has been devoted recently to producing a propellant system for a space vehicle that is capable of accelerating the vehicle to an extremely high velocity. Needless to say, where extremely long distances are to be traversed the ultimate speed to which the space vehicle can be propelled is of utmost importance. As is well known, one of the most accurate methods of determining the ultimate capabilities of a given propulsion system for propelling a space vehicle at high velocities is to measure or calculate its specific impulse. Once the specific impulse of a propulsion system is known the maximum acceleration and velocity that such a system can impart to a space vehicle can be readily determined. Thus, the higher the specific impulse of a propulsion system the higher will be the ultimate velocity attainable by the space vehicle being propelled.

Chemical rockets of the type now utilized as boosters and space vehicle power plants are limited to values of specific impulse in the neighborhood of 400 seconds by the available chemical enthalpy of the propellants while thermal nuclear rockets are limited to a specific impulse of around 800 seconds by reason of material limitations. However, ion rockets are capable of providing a specific impulse of 10,000 seconds or even higher, if desirable. This capability for providing extremely high values of specific impulses has resulted in an intensive research program being undertaken to adapt ion rockets for use as the main power plant on space vehicles.

However, besides being capable of developing the specific impulse required for propelling a space vehicle on a given mission or voyage, an ion engine must be capable of functioning under rather adverse circumstances. For example, an ion engine must operate properly when variations in the fuel rate occurs and it must also be capable of successfully starting and shutting down numerous times as would be required in making vernier corrections in the position or velocity of the space vehicle. Furthermore, extremely high operating temperatures, acceleration forces and zero-gravity environmental conditions must have no adverse effect upon the operation of the ion engine. These requirements among others have placed rather severe restrictions on the construction and function of not only the ion engine proper but also upon many of its associated parts such as the fuel system, for example.

Since the operation of a successful ion engine requires the presence of a suitable fuel and the dependable performance of a system for delivering and metering the fuel to the engine proper, much consideration has been given to the type fuel that should be used. The necessity for close control of the flow of the fuel at relatively low flow rates and the design of the ionizing element of the engine both required that the fuel be delivered to the engine in a vapor state. The flow rate of the fuel can then be readily controlled by adjusting the pressure of the vapor, or in essence, by controlling the temperature of the coolest portion of the fuel feed system. After evaluating the various fuels available, elemental cesium was selected because of its high atomic weight and low ionization potential. However, the same low ionization potential which is essential to the functioning of the ion propulsion system is also an indication of the extreme reactive properties of cesium as a reducing agent. For example, elemental cesium readily reacts with oxygen to form cesium super oxide which will, in turn, react explosively with water liberating hydrogen and forming cesium hydroxide. Because of this affinity for water and moisture, the use of cesium as a fuel places severe requirements upon the design and construction of the fuel system.

Prior to this invention it has been the practice in the space propulsion field to carry the cesium vapor producing material necessary for the operation of the ion engine either in the form of elemental cesium metal, or a cesium compound that could be reduced by a chemical reaction to give cesium vapor. The first of these methods is the simplest technique in principle and the one which has heretofore been followed in most cases. This method involves the filling of the fuel tank system of the space vehicle with elemental cesium just prior to the beginning of the space flight and thereafter maintaining a rigidly dry and inert atmosphere throughout the system until flight altitude is reached. The cesium is then ready to be vaporized and delivered to the emitter of the ion engine by adjusting the temperature of the fuel supply system or by other suitable pressurization schemes.

The principal advantages of using pure cesium are that no waste weight is carried and that no intermediate step of reducing a cesium compound is necessary before starting the engine. Furthermore, no additional power to initiate and support a chemical reaction is required since the power requirements are confined to the conversion of the cesium to the vapor state.

However the use of pure cesium has several disadvantages among which is its extreme reactivity when exposed to air and water. As explained hereinabove, if any air and water should reach the cesium metal during handling or storage a coating of cesium super oxide will form on the surface of the metal which will, in turn, make the handling of the fuel extremely dangerous due to the potentially explosive nature of cesium super oxide. This is true since alkali metal super oxides have been known to react explosively with free cesium metal when forced into close contact which results when the storage system containing the cesium fuel is pressurized for feed control purposes. There is always the further possibility that the oxides of other compounds which are formed may adversely affect the flow of the vaporized ions through the emitter of the ion engine and thus reduce the performance of the engine.

Furthermore, the physical state of pure cesium is that of a liquid at temperatures above 28.5 degrees centigrade and, since the temperature within the storage tanks of a space vehicle will be maintained above this level, the cesium fuel can be expected to remain a liquid throughout any space voyage. As liquids are much more difficult to control than solids or vapors in a zero gravity situation, and since the ion engine will normally be functioning under zero gravity conditions, it has heretofore been necessary to equip the ion propelled space vehicles with certain additional systems to cope with the liquid fuel problem. The solution to this problem of handling liquids has usually been solved by utilizing a complex pumping system or devices for creating an artificial gravity within the cesium fuel system. Needless to say, both of these solutions require that the vehicle carry considerable additional weight and the necessity of these systems operating properly throughout the space voyage greatly reduces the dependability of the ion engine.

The second technique of preparing the cesium vapor in situ by chemically reducing suitable cesium compounds is looked upon with some favor since the compounds are generally stable and relatively inert to air and moisture thereby making them much easier and safer to transfer, handle and store. Also the compounds that are usually employed in an ion engine are not difficult to obtain in pure forms and do not require the elaborate precautions necessitated by elemental cesium. The reducing of cesium salts by means of various chemical reducing agents would appear to offer the best selection of chemical reactions.

Chemical reduction in situ of cesium salts is generally not an acceptable method for obtaining cesium fuel for an ion engine, however, since it necessarily has the disadvantage of requiring that additional dead weight in the form of a reducing agent must be carried on the flight. This is particularly true since the present practice is to use a large excess of reducing agent to obtain a good yield of cesium. Furthermore, the yield produced when cesium compounds are reduced with a chemical agent is low, ranging from 62 to 70 percent for presently operating methods and 73 to 81 percent for particularly promising but uninvestigated reactions. Another and more serious disadvantage is the formation of large amounts of solid by-products which have a serious effect on the functioning of the ion propulsion system. A final problem is that the reactions take place for the most part at high temperatures ranging from 600° to 1000° centigrade thereby creating additional power requirements upon the space vehicle power supply.

According to the present invention it has been found that the above enumerative limitations and disadvantages associated with prior known ion engines, which rely upon either stored elemental cesium metal or cesium compounds that must be chemically reduced for a source of ion fuel, can be substantially reduced or totally eliminated by utilizing a fuel feed system employing a solid cesium compound that can be thermally decomposed thereby releasing cesium vapor for use as an ion fuel. This thermally responsive solid fuel feed system is not only advantageous because it eliminates the liquid handling and storage problem but also because less storage volume is required, a high theoretical yield of cesium is obtained, and the cesium containing compound is converted from a solid directly to a cesium vapor without producing a useless solid by-product. Furthermore, the use of a solid fuel feed system reduces the complexity of the ion engine while at the same time permitting the vapor cesium fuel feed rate and thus the propulsion of the ion engine to be accurately varied over an extremely wide range. The problems associated with zero-gravity operations and acceleration forces are also greatly reduced by the novel ion engine and solid fuel feed system of the present invention.

Accordingly, the primary object of this invention is to provide an ion rocket engine which utilizes a solid fuel.

Another object of this invention is to produce a solid cesium fuel feed system for an ion engine.

Yet another object of this invention is to provide an ion engine propulsion system utilizing a thermally decomposed solid cesium fuel which is capable of prolonged periods of operation yet is extremely simple and inexpensive to produce and operate.

These and further objects and advantages of this invention will be more apparent upon reference to the following specification, claims, and appended drawing which illustrates an ion engine that is fed an ionizable vapor fuel from a solid propellant feed and thermal decomposing system constructed in accordance with one concept of the present invention.

The single figure is a longitudinal cross-sectional view through the ion engine.

Several solid compounds of cesium are known to decompose thermally to yield pure cesium. These decomposed reactions are special cases of oxidation-reduction in which the anion of the compound functions as the reducing agent at elevated temperatures. The compounds can be made in relatively pure form and there are no problems of thorough mixing as is required in reactions having the cesium compound and the reducing agent stored in separate solid phases. In addition there is no loss in efficiency of the reaction because of the necessity of using an excess of reducing agent to assure a complete reaction since the reducing agent is the anion and is present in exactly the stoichiometric amount required for the reaction. Furthermore, since the reaction is endothermic it can be very accurately controlled with simple and reliable equipment. The thermal decomposing of selected cesium compounds therefore combines the advantages of both the pure cesium metal and chemically reduced cesium compounds without having any of their inherent limitations.

Among the compounds of cesium that will thermally decompose to yield pure cesium and a gaseous by-product is cesium azide, cesium hydride and cesium deuteride. The decomposer of these compounds give a gaseous by-product of nitrogen, hydrogen, or deuteride, respectively, thus eliminating the problem of solid by-products such as occur in chemical reductions. All three decompose smoothly at a relatively low temperature, generally under 400° centigrade, therefore no large power requirements are imposed.

Cesium azide ($CsN_3$) represents one of the easiest compounds to handle. It is a stable solid, soluble in water but not decomposed, inert to air, is easily purified of all common impurities and can be stored for long periods of time (at least a year) without noticeable deterioration. Its temperature of decomposition is relatively low; initial decomposition occurring at 390° centigrade, then proceed smoothly at 350° centigrade with the solid having a melting point of 326° centigrade. The only decomposition produced when cesium azide is thermally decomposed is gaseous nitrogen. However, the yield of cesium azide is relatively low (75.99%) as compared to the decomposition of either cesium hydride (99.25%) or cesium deuteride (98.52%) and the possibility of increased sputtering caused by defluction of cesium ions by nitrogen molecules presents a source of possible malfunction within the ion engine.

The thermal decomposition of cesium hydride from a solid fuel directly to cesium vapor produces a yield of 99.25% based upon total fuel weight. Since the decomposition pressure of cesium hydride is less than 2 mm.-Hg at 210° centigrade and 36 mm.-Hg at 320° centigrade, the power requirements to decompose the cesium hydride is relatively low. Another advantage of cesium hydride over metallic cesium is its greater density. The formation of cesium hydride results in a lattice contraction of approximately 45% over that of metallic cesium with the resultant density of cesium hydride being 3.42 g./cc. compared to 1.90 g./cc. for pure cesium metal.

The dissociation pressure of cesium deuteride at 320° centigrade is 80.4 mm.-Hg as compared to 36 mm.-Hg for cesium hydride at the same temperature. This higher dissociation pressure plus the slightly lower yield of cesium deuteride makes the use of cesium hydride more preferable in most instances.

Therefore, since cesium hydride is generally more acceptable to most missions in which an ion engine is used, the operation of an ion engine using cesium hydride as a fuel will be discussed in detail hereinbelow. It is to be realized, however, that other solid compounds which will decompose to give cesium in a vapor form, such as cesium azide or cesium deuteride discussed hereinabove, could be used when such is desirable with only slight modifications being required in the ion engine configuration.

In the accompanying drawing, an ion engine is shown generally as 10 which derives its cesium vapor propellant fuel from a solid cesium containing compound. This ion engine 10 consists generally of six major components, namely, a storage reservoir 12, vapor generator 14, metering system 15, gas separator system 16, ion chamber 17, and propulsion or engine control system 18.

The storage reservoir 12 is shown in the form of a tank 20 which, as the name implies, is used for storing the solid cesium hydride 22 that will be utilized as the source of vapor cesium fuel during the operation of the ion engine 10. Since cesium hydride is a white crystalline solid having a lattice construction somewhat similar to sodium chloride, it can readily be formed into a powder, pellet or a solid stick type configuration. For purposes of illustration, the cesium hydride is shown in the form of small pellets. The storage reservoir 12 can be formed of any material that will withstand the extreme environmental conditions encountered in outer space and will not deteriorate when exposed to the solid cesium hydride. In general, it has been found that the use of the 300 series of stainless steel, e.g. 347, is suitable for use as a reservoir forming material. The reservoir 12 can be formed in any desired shape or size that will be compatible with a space vehicle in which it will be housed and will store a sufficient amount of fuel for the propulsion to be required.

As mentioned hereinabove, since the density of cesium hydride is 3.14 g./cc. at 20° centigrade compared to 1.90 g./cc. for metallic cesium, a contraction of 44.9% in volume occurs when cesium hydride is prepared from fundamental cesium. This contraction is one of the primary advantages of cesium hydride over elemental cesium since the saving of nearly 45% in fuel storage space constitutes a significant reduction in both the size and weight of the fuel storage system. For example, a 300 day operating supply of cesium hydride for an ion engine consuming $5 \times 10^{-5}$ pounds/second of pure cesium can be stored in a storage reservoir having a capacity of 6.1 cubic feet and would weigh approximately 1,306 pounds. An equivalent supply of pure cesium fuel would require a storage reservoir having a capacity of approximately 8.8 cubic feet. This saving in the size of the storage reservoir 12 would permit the overall size and weight of the propulsion system of the space vehicle to be reduced thus permitting more payload to be carried which, needless to say, is of the utmost importance in space exploration.

The pellet shaped cesium hydride fuel 22 is fed from the storage reservoir 12 to the vapor generator 14 and metering system 15 through a suitable conduit of pipe 26. A suitable mechanical system such as an auger, plunger or conveyor belt (not shown) may be employed for forcing the solid cesium hydride from the storage reservoir 12 through the conduit 26 into the vapor generator and metering system. The solid cesium hydride can also be force fed under certain conditions by pressurizing the storage reservoir 12 when such is desirable.

The vapor generator 14 consists of a cylindrical heater chamber 28 which has its input duct 42 secured by suitable means such as by threading to the conduit 26. The heat chamber 28 is preferably formed of a refractory metal such as molybdenum which is capable of withstanding the high temperatures and corrosive conditions encountered in reducing the solid cesium hydride pellets 22 to cesium and hydrogen. A heating element 30 formed from tungsten or some other like material is insulatively supported within the heat chamber 28 by a plurality of electrical feed through conductors 32 and insulative grommets 34, one of which is shown mounted at the top of the chamber. For purposes of more readily controlling the heat produced by the element 30, the heating element is preferably segmented or formed as a plurality of individual elements which may be switched on or off independently of one another. A porous heat reflector 36, which has apertures 38 formed therein for permitting the passage of the vaporized cesium hydride therethrough, is mounted adjacent the heating element 30 so that the reflector is between the element and the output duct 40 of the heating chamber 28. The heat reflector 36 serves to direct substantially all of the heat produced by the heating element 30 onto the inter-face 44 formed by the solid cesium pellets 22 as they are fed into the chamber. This permits the near instantaneous vaporization of a portion of the cesium hydride in a manner that will be more fully explained hereinafter.

The cesium vapor and gaseous hydrogen produced by the thermal decomposition of the solid cesium hydride passes through the output duct 40, as indicated by the arrowheads, into the metering system 15. This metering system is shown for simplicity as an electromagnet operated valve consisting of a T shaped housing 46 having an input aperture 48 that is gradually tapered to form the orifice or entrance to a metering passage 50. A spring loaded needle valve 52 is seated in the metering passage 50 so as to normally block or close the passage thereby effectively cutting off the flow of vaporized cesium fuel into the ionization chamber of the ion engine. A solenoid winding 54 is positioned around the needle valve 52 and, depending upon the electrical potential fed into the winding from the control system 18, serves to position the needle valve within the metering passage 50 thus effectively controlling the open area through the passage. The downstream side of the metering passage is flared out to form an enlarged output aperture 56 which is threaded or otherwise secured to the input of the gaseous separator 16.

The gas separator or exchange 16 is shown in the cesium vapor and gaseous hydrogen flow stream to illustrate one method of removing the gaseous hydrogen, or any other gaseous material that it may be desirable to remove, prior to its entering the ionization chamber 17 of the ion engine 10. Due to its simplicity of construction and operation a palladium leak diffusion exchange, which consists of a hollow housing 58 having a corrugated palladium diffusion layer 60 formed around its inner surface, is shown used in the present ion engine. As the hot gases containing the hydrogen enter the exchange 16, and thus come into contact with the inside surface of the thin corrugated sheet or film of palladium which forms the diffusion layer 60, the hydrogen will permeate from the area of high pressure (the area within the exchange 16) through the palladium diffusion layer to the area of low pressure leaving only relatively pure cesium in a vapor form within the exchanges.

Although palladium metal is used in the present separator it is to be realized that other materials besides palladium which will permit the passage therethrough of hydrogen but will not pass the cesium vapor may be used. The size of the exchange required to assure adequate separation of the gaseous by-products produced when the cesium containing compound is decomposed will obviously vary depending on the size of the ion engine, fuel feed rate and other like considerations. The correct size for each application can readily be determined, however, by assuming the principle resistance to diffusion is the barrier layer 60 itself, that the pressure of the gases on the outside circuit of the diffusion barrier 60 is zero (space conditions), and that the system is isothermal at $T_0$. The separated gases, which in the case of the thermal decomposition of cesium hydride would be primarily hydrogen, is vented from the gas separator 16 through tube 62 where it can be dumped from the space vehicle as a waste by-product or, preferably, utilized to form some useful function in the operation of the space vehicle.

Although a diffusion type separator is extremely reliable and simple it is to be realized that other gas separators can be used. For example, a mechanical type of gas separator can be used whenever desirable if there is a sufficient difference in the atomic weight of the cesium vapor and gases to be separated.

The pure cesium vapor from the gas separator 16 is fed directly into the ionization chamber 17 which is of the type known generally as a Kaufman ion engine. This ionization chamber 17 is shown with a cylindrical housing 64 having a centrally located aperture 66 through which the vapor cesium flows into the chamber. A baffle wall 68 having a centrally located aperture 70, which is shielded from the aperture 66 by a spaced baffled plate 72, is included in the flow path of the vapor cesium fuel to assure uniform distribution and flow of the cesium into the ion chamber 74 as pictorially represented by the arrowheads.

As can be seen in the figure the major portion of the cesium fuel vapor as it flows from the aperture 70 will be directed substantially along the center axis of the ion chamber 74. Therefore the ionizer or cathode 76 of the ion engine is suspended by electrical leadout terminals 78–80 so as to be parallel with and located in substantially the center of the cesium fuel vapor flow stream thereby assuring that the highest degree of ionization will occur. The anode of the ion engine is a cylindrical shaped cylinder 82 which is axially suspended within the housing 64 by suitable means (not shown). The cylindrical anode 82 is electrically connected to an electrical leadout 84 which passes through an insulator 86 in the housing 64. The leadout terminals 78–80 from the cathode 76 are also passed through similar insulators 88 in the housing 64 as well as insulators 90 in the anode 82.

To accelerate the cesium fuel vapor as it is ionized by the cathode 76 and the ion chamber 74, a woven wire screen 92 and accelerating grid 94 are located in the nozzle 96 of the cesium ion engine 10. A second filament 98 is also located within the stream of the ionized cesium for neutralizing the ion beam thereby preventing the space vehicle from becoming highly charged. Electrical lead-in terminals 100–102, which pass through insulators 104 in the housing 64, are utilized to connect the neutralizing filament 98 to a suitable power source 104 and ground 106, respectively.

A power source 108 is connected across the two leadout terminals 78 and 80 for energizing and heating the ionizing filament 76 while bias supplies 110 and 112 are connected through electrical leadouts 84 and 114 to the anode 82 and accelerating grid 94. The screen grid 92 is biased through electrical leadouts 116 and conductor 118 at substantially the same potential as the ionizing cathode 76. Both leadouts 114 and 116 are electrically insulated from the outer housing 64 by the insulators 120. A bias supply 122 is connected between the leadouts 78 and 84 to establish an operating potential between the cathode 76 and anode 82.

As in most ion beam systems, a magnetic field is utilized to concentrate the cesium ion beam and to prevent the electrons from reaching the inner walls of the housing 64 and anode 82. This field is produced by a circular ring like magnet 124 which is positioned around the housing 64 and may be of either the permanent or electrical type depending upon which type is more desirable in each particular ion engine.

For the thermal decomposition of cesium hydride to progress smoothly and the reaction $$2C_sH \rightarrow 2C_s + H_2$$

to be in true equilibrium, it is necessary to have the entire vapor generator 14, metering system 15 and gas separator 16 at a temperature that is sufficiently high to prevent local condensation of the cesium from occurring. If the cesium were allowed to condense at a cold point in the system it would destroy the equilibrium and result in liquid cesium being present in the ion engine. To assure that the proper temperature is maintained in the systems 14–16, a layer of insulating material 126 which has embedded therein a heating element 128 of the resistance wire type is placed around the outer surface of the systems. This layer of insulation and the heating element 128 serves to maintain the temperature of the system 14–16 well above the condensation point for cesium.

The ion control system 18 may be of several different types but is shown for purposes of illustration as a loop type which is operated by balancing two input signals until a proper accelerating force is produced. The operation of this type control system can be described in substantially the following manner. With the speed of the space vehicle at a proper level, the signal from the velocity control 130 of the space vehicle will exactly equal the signal being produced by the acceleration or position detector 132. Since both the signals produced by the velocity control 130 and acceleration detector 132 are fed into a comparer circuit 134 of the type which produces an output when the signal from the velocity control exceeds that of the detector, no output signal will be produced by the comparer circuit. To accelerate the space vehicle the velocity control 130 is adjusted so that the output from the velocity control is increased and now exceeds the signal from the acceleration detector 132. This in turn results in the comparer circuit 134 producing an output signal proportional to the different in the two signals applied thereto. This output signal is applied directly to a flow rate control circuit 136 which is utilized to detect and regulate the amount of vaporized cesium that is flowing into the vapor chamber 17 of the ion engine.

To initially start the flow of vaporized cesium into the vapor chamber 17 the flow rate control circuit 136 produces an output signal which is connected to power supply circuit 138. This results in the power supply circuit being actuated so that the heating element 30 is brought up to its operating temperature and the solenoid winding 54 of the metering system 15 energized to open the metering passage 50. As the heat from the heating element 30 decomposes the solid cesium hydride 22 at the inner face 44 thus producing cesium vapor and hydrogen, a gas pressure will begin to build up within the vapor generator 14 thereby forcing a portion of the gases through the metering system 15 into the gas separator system 16 where the hydrogen is removed and the cesium vapor admitted through aperture 66 into the ionization chamber 17.

The exact amount of cesium vapor that is flowing into the ionization chamber 17, and thus the amount of acceleration being produced by the ion engine 10, can be accurately determined by using one of several methods. Perhaps the simplest of these methods involves the use of a counting transducer or radiation detector 140 which is shown inserted in the line connecting the metering system 15 to the separator system 16. To activate the radiation detector 140 a small amount of radioactive isotope such as cesium 137 is evenly dispersed throughout the solid cesium hydride during its manufacture. As the cesium hydride is thermally decomposed the radioactive cesium 137 will be released and flow with the vapor cesium past the detector 140 thereby producing an output pulse or count. As will be readily apparent, the pulses produced as the cesium 137 passes the radiation detector 140 will give a very accurate indication of the flow rate of the cesium vapor. Other indicators such as a thermal or pressure responsive device could be used in place of the radiation detector 140 if such were desirable.

The pulses generated by the radioactive isotope are fed from the radiation detector 140 into the flow rate control circuit 136 which, preferably, then adjusts the power supply 138 so that a combined metering and thermal control is exerted over the flow rate of the vesium vapor to give the desired acceleration to the space vehicle. This combined control utilizes the metering system 15 to give good flow control when a low flow rate of cesium vapor is required while the thermal system including the heating element 30 is utilized to give an accurate control at higher flow rates.

Upon receiving an initial signal from the flow rate control circuit 136 the power supply 138 progressively energizes both the heating element 30 and metering system 15. Since the metering system 15 is readily responsive to very small variations in power, it will exert a greater control over the flow rate of the cesium vapor until the maximum opening of the metering passage 50 is reached. Thereafter, high flow rates of the cesium vapor to the ionization chamber 17 are obtained by controlling the temperature produced by the heating element 30 and thus the pressure within the vapor generator 14. By adjusting this pressure the higher flow rate through the open metering passage 50 can be accurately varied over a wide range of values.

As the flow rate of the cesium vapor, and the radioactive cesium isotope, increases pass the detector 140 the output pulse rate from the detector will increase by a proportional amount. When these output pulses from the detector 140 reach a value equal to the signal applied to the flow rate control system 136 from the comparer circuit 134, the flow rate control circuit will maintain the output of the power supply 138 at a constant value thereby holding the propulsion of the ion engine 10 constant. Once the signal from the comparer circuit 134 decreases, as would be caused by either the output signal from the velocity control 130 or acceleration detector 132 being reduced, the flow rate control circuit 136 will sense through the output pulses from the detector 140 that the flow rate of the cesium vapor is too high and will gradually reduce the output of the power supply 138 until equilibrium within the ion engine 10 is again reached.

Besides the combined use of both the metering and vaporizing systems for controlling the cesium vapor flow rate, various other methods of control are possible. For example, either a thermal or metering system could be used as the only control system. In the thermal control system the metering system 15 could be replaced with a plate (as shown by the broken lines 142 in the aperture 66) having a passage 144 of a predetermined size form therein. The power supplied to the heating element 30 is now varied so that a varying temperature is applied to the inner face 44 of the solid cesium hydride 22 which, in turn, results in the decomposition rate of the cesium hydride being varied by a corresponding amount. Since the pressure produced by the cesium vapor and hydrogen is directly proportional to the decomposition rate of the cesium hydride, and the flow of the cesium vapor through the passage 144 of the plate 142 is dependent on the pressure of the cesium vapor, the flow of cesium vapor into the ionization chamber 17 is readily controlled in this manner.

The metering system of controlling the cesium vapor flow rate requires that the temperature of the heating element 30 be held at a constant value thereby causing the cesium vapor and hydrogen gases pressure within the vapor generator 14 to be maintained at a substantially constant level. With the gas pressure within the vapor generator at this substantially constant level the movement of the needle valve 52 will regulate the cesium vapor flow through the metering passage 50 and thus control the ion engine 10 in a well known manner. A wide control range of approximately 20,000 to 1 has been obtained in this manner.

Various other modifications in the construction, control and operation of the ion engine 10 will also be readily apparent to those working with ion engines. For example, the segmented heating element 30 could be replaced with a boiler type heating unit which would heat the entire vapor generator 14 in much the same manner that an oven is heated. Such a surface heating unit is generally not used, however, because of the time lag involved. In the ion engine 10, approximately 28.3 cubic inches of solid cesium hydride 22 is present within the vapor generator 14 at all times and to vaporize this amount by surface heating would require approximately 5 hours. This time lag is excessive when it is realized that a radiation heater like the heating element 30 is required to heat only the inner face 44 which has an area of approximately 28.3 square inches. By radiation heating this outer layer of the inner face 44 can be vaporized at approximately 0.25 second after the heating element 30 is energized thus substantially eliminating any time lag between the energization and actual response of the ion engine 10.

The storage reservoir 12 can also be replaced if such is desirable by a plurality of vapor generators similar to the vapor generator 14 which have been pre-loaded with a given amount of solid cesium hydride. By sequentially energizing and connecting these plurality of vapor generators to the metering system 10 it would be possible to produce a sustained output of cesium vapor as would be required for a long space voyage.

It will be apparent from the foregoing that the present ion engine 10 offers numerous advantages over prior known ion engines. The use of cesium hydride as the source of cesium vapor rather than elemental cesium results in the elimination of numerous problems heretofore encountered in ion engine fuel systems. The fact that cesium fuel is generated as a vapor by the decomposition of solid cesium hydride under non-equilibrium conditions with no intermediate liquid phase is quite important since the absence of a liquid phase is desirable in zero gravity conditions. Where elemental cesium is used the liquid phase is present thereby introducing into the fuel feed system the liquid configuration and handling problems associated with zero gravity operation. The greater density of cesium hydride (3.42 g./cc.) as compared to elemental cesium (1.90 g./cc.) permits a reduction of approximately 45% in the size of the fuel storage facilities required for a given mission thus permitting a greater utilization of the booster vehicle being employed. The anion (the hydride ion) action as the reducing agent and being present in the exact stoichiometric quality in the crystal of cesium hydride to produce an extremely high yield of cesium vapor (99.25% by weight) eliminates the problem of supplying the necessary ingredients to reduce the cesium fuel that has heretofore plagued the users of cesium salts. A source of hydrogen for operating other systems of a space vehicle is also produced by the decomposition of cesium hydride thus giving an added advantage to the use of solid cesium hydride as a fuel.

Furthermore, since the thermal decomposition of cesium hydride takes place at around 400° centigrade, very low power is required from the ion engine power supply. A closer control over the rate of cesium being fed to the ionization chamber than has heretofore been readily obtainable is also realized by the regulating of not only the metering system but also the thermal heating element of the present cesium hydride fuel feed system.

The invention may be embodied in other specific forms without departing from the spirit or essential characteristics thereof. The present embodiment is therefore to be considered in all respects as illustrative and not restrictive, the scope of the invention being indicative by the appended claims rather than by the foregoing description, and all changes which come within the meaning and range of equivalence of the claims are therefore intended to be embraced therein.

What is claimed and desired to be secured by United States Letters Patent is:

1. Ion producing apparatus, comprising:
   (A) a source of solid particles;
   (B) heat producing means adapted to heat said source of solid particles thereby causing said particles to decompose into a gaseous vapor;
   (C) control means connected to said heat producing means,
      (1) said control means being adapted to vary the output of said heat producing means thereby varying the decomposition rate of said solid particles and the production of gaseous vapor resulting therefrom;
   (D) ionization means located adjacent said source of solid particles and adapted to receive said gaseous vapor,
      (1) said ionization means acting upon said gaseous vapor to form ions;
   (E) signal producing means operatively positioned on said ion producing apparatus for detecting the rate at which said solid particles are being decomposed into a gaseous vapor and generating an output signal proportional thereto; and
   (F) means connected between said sensing means and said control means for applying said output signal to said control means,
      said output signal being adapted to operate said control means thereby causing the output of said heat producing means to be varied and the rate at which said gaseous vapor is being produced to be held at a predetermined level.

2. Ion producing apparatus, comprising:
   (A) solid particles of vapor producing material;
   (B) heat producing means adapted to heat said solid particles thereby causing said particles to decompose into a gaseous vapor;
   (C) regulating means connected to said heat producing means,
      (1) said regulating means being adapted to control the output of said heat producing means thereby varying the decomposition rate of said solid particles and the production of gaseous vapor resulting therefrom;
   (D) ionization means adapted to receive said gaseous vapor,
      (1) said ionization means acting upon said gaseous vapor to form ions;
   (E) metering means operatively connected to said ionization means for regulating the flow rate of said gaseous vapor into said ionization means; and
   (F) control means connected to said regulating means and said metering means,
      (1) said control means being adapted to simultaneously control said regulating means and said metering means so as to control the rate at which said ions are produced.

3. Ion producing apparatus, comprising:
   (A) a source of solid particles;
   (B) vaporizing means connected for receiving solid particles from said source,
      (1) said vaporizing means being adapted to decompose thermally said solid particles into a gaseous vapor;
   (C) separator means operatively connected to said vaporizing means for receiving said gaseous vapor,
      (1) said separator means being adapted to extract certain gas by-product contained within said gaseous vapor while passing the remainder of said gaseous vapor therethrough; and
   (D) means operatively connected to said separator means for receiving and converting said gaseous vapor passed through said separator means into an ionized medium.

4. Ion producing apparatus, comprising:
   (A) an enclosure containing solid particles;
   (B) heat producing means adapted to heat said enclosure thereby causing said solid particles to decompose into a gaseous vapor;
   (C) regulating means connected to said heat producing means,
      (1) said regulating means being adapted to vary the output of said heat producing means thereby varying the decomposition rate of said solid particles and the production of gaseous vapor resulting therefrom;
   (D) separator means operatively connected to said enclosure and adapted to receive said gaseous vapor,
      (1) said separator means functioning to extract certain gas by-products contained within said gaseous vapor while passing the remainder of said gaseous vapor therethrough;
   (E) metering means positioned between said enclosure and said separator means for regulating the flow rate of said gaseous vapor from said enclosure into said separator means; and
   (F) ionization means operatively connected to receive said gaseous vapor passed by said separator means,
      (1) said ionization means acting upon said gaseous vapor to form ions.

5. Ion producing apparatus according to claim 4 wherein said heat producing means, said metering means and said separator means are housed within an insulative layer of matters for maintaining the temperature of said gaseous vapor above its condensation point.

6. Ion producing apparatus according to claim 5 wherein said insulative layer includes a heating element for maintaining the temperature of said insulative layer at a predetermined level.

7. Ion producing apparatus according to claim 6 wherein said solid particles are formed of a cesium containing compound.

8. Ion producing apparatus according to claim 7 wherein said cesium containing compound is cesium hydride.

9. Ion producing apparatus according to claim 4 wherein said heat producing means is formed of a plurality of individual heat producing elements that are independently operated by said regulating means thereby permitting the thermal output of said heat producing means to be accurately varied over an extended range.

10. Ion producing apparatus according to claim 9 wherein said heat producing means includes a porous heat reflector positioned to direct substantially all of the heat produced by said heat producing means upon said solid particles.

11. An ion engine, comprising:
    (A) an enclosure,
       (1) said enclosure having an orifice formed therein;
    (B) a source of solid particles;
    (C) means for continuously supplying said solid particles from said source into said enclosure;
    (D) heat producing means adapted to heat said solid particles located within said enclosure thereby decomposing said solid particles into a gaseous vapor;
    (E) control means connected to said heat producing means,
       (1) said control means being adapted to control said heat producing means for varying the rate at which said solid particles are decomposed thereby regulating the amount of gaseous vapor being produced;
    (F) ionization means connected to said orifice for receiving said gaseous vapor formed within said enclosure, (1) said ionization means being adapted for converting said gaseous vapor into a source of ions; and
(G) acceleration means connected to said ionization means for receiving and accelerating said ions.

12. An ion engine, comprising:
(A) an enclosure,
(1) said enclosure having an orifice formed therein;
(B) a source of solid particles;
(C) means for supplying said solid particles into said enclosure;
(D) heat producing means adapted to heat said solid particles located within said enclosure thereby decomposing said solid particles into a gaseous vapor,
(1) said heat producing means including a plurality of individual heating elements;
(E) control means connected to said individual heating elements of said heat producing means,
(1) said control means being adapted to independently control each of said individual heating elements for varying the rate at which said solid particles are decomposed over an extended range thereby directly regulating the amount of gaseous vapor being produced;
(F) variable flow area metering means connected to said orifice for regulating the flow rate of said gaseous vapor from said enclosure;
(1) said metering means being operatively connected to said control means so that said heat producing means and said metering means are operated simultaneously for accurately controlling the rate at which said gaseous vapor is produced and flows from said enclosure;
(G) gas separator means connected to said metering means and adapted to receive the gaseous vapor flowing through said metering means,
(1) said gas separator acting to filter said gaseous vapor flowing therethrough for removing the gaseous by-products contained therein while passing the desired gaseous vapor;
(H) a casing having upstream and downstream ends,
(1) said volume within said casing defining an engine chamber;
(I) means for connecting said upstream end of said casing to said gas separator end so that said gaseous vapor passed through said gas separator enters into said engine chamber;
(J) ionizing means situated within said chamber for ionizing the gaseous vapor entering said chamber thereby forming ions;
(K) means for accelerating said ions so that said ions are emitted from said downstream end of said casing thereby forming a jet of ions; and
(L) neutralizer means situated in said downstream end of said casing for neutralizing said ions as they are emitted from said casing.

13. An ion engine according to claim 12 wherein said heat producing means is mounted within said enclosure.

14. An ion engine according to claim 13 wherein a heat reflector is mounted within said enclosure for directing substantially all of the heat produced by said heat producing means upon the interface formed by said solid particles being supplied to said enclosure.

15. An ion engine according to claim 14 wherein said metering means is an electrically operated valve.

16. An ion engine, comprising:
(A) an enclosure,
(1) said enclosure having an orifice formed therein;
(B) a source of cesium hydride located within said enclosure;
(C) a heat producing means consisting of a plurality of individually operated heating elements mounted within said enclosure for vaporizing said cesium hydride thereby forming vapor cesium and hydrogen;
(D) heat reflector means mounted within said enclosure for directing substantially all of the heat produced by said heat producing means upon said cesium hydride.
(E) control means connected to each of said individually operated heating elements of said heat producing means,
(1) said control means being adapted to control each of said individual heating elements separatively thereby varying the heat produced by said heat producing means for regulating the rate at which said cesium hydride is decomposed into vapor cesium and hydrogen;
(F) electromagnetically operated metering means connected to said orifice for receiving and regulating the vapor cesium and hydrogen flowing from said enclosure;
(G) means for operatively connecting said metering means to said control means whereby the operation of said metering means and said heat producing means are synchronized for accurately varying the rate at which said vapor cesium and hydrogen is produced in and allowed to flow from said enclosure;
(H) hydrogen gas separator means connected to said metering means and adapted to receive said vapor cesium and hydrogen flowing through said metering means,
(1) said hydrogen gas separator acting to separate said vapor cesium from said hydrogen,
(2) said hydrogen being directed into a venting port and said vapor cesium into an output duct;
(I) a casing having upstream and downstream ends,
(1) said volume within said casing defining an ion engine chamber;
(J) means for connecting said upstream end of said casing to said output duct of said gas separator so that said vapor cesium flowing through said gas separator is fed into said ion engine chamber;
(K) a hot filament cathode situated within said ion engine chamber so that said vapor cesium is ionized by high-velocity electrons emitted by said cathode thereby forming ion;
(L) means for energizing said cathode to effect generation of electrons therefrom;
(M) electrostatic means for accelerating said ions toward said downstream end of said casing thereby forming a jet of ions; and
(N) neutralizer means situated in said ion jet for neutralizing said ions as they are emitted from said casing.

17. An ion engine according to claim 16 wherein said hydrogen gas separator includes an extended surface palladium leak.

18. An ion engine according to claim 17 wherein said cesium hydride is continually fed into said enclosure from a storage means.

19. An ion engine according to claim 18 wherein said cesium hydride is in the form of pellets.

20. An ion engine according to claim 16 wherein a flow responsive indicator is connected to said control means and positioned in the flow path of said vapor cesium and hydrogen flowing into said hydrogen separator means for operatively controlling said control means thereby maintain a predetermined flow rate of said vapor cesium and hydrogen into said gas separator.

21. An ion engine according to claim 20 wherein said flow responsive indicator is actuated by a radioactive isotope contained in said cesium hydride.

22. An ion engine according to claim 16 wherein means is provided around said ion engine for maintaining said vapor cesium at a temperature above its condensation point.

23. An ion engine according to claim 22 wherein said means is an insulative coating.

24. An ion engine according to claim 23 wherein said insulative coating includes a heating element for maintaining the temperature of said coating at a predetermined level above the condensation point of vapor cesium.

References Cited by the Examiner

UNITED STATES PATENTS

| | | | |
|---|---|---|---|
| 2,621,296 | 12/52 | Thompson | 250—41.9 |
| 2,715,692 | 8/55 | Cardwell | 250—41.9 |
| 2,733,348 | 1/56 | Lawton et al. | 250—41.9 |
| 2,773,561 | 12/56 | Hunter | 55—16 |
| 2,962,123 | 11/60 | Darling | 55—16 |
| 2,991,389 | 7/61 | Grant et al. | 250—41.9 |
| 3,014,154 | 12/61 | Ehlers et al. | 60—35.5 |
| 3,117,416 | 1/64 | Harries | 60—35.5 |

OTHER REFERENCES

Advanced Propulsion Techniques (Penner), published by Pergamon Press (New York) 1961, pages 77–79.

SAMUEL LEVINE, *Primary Examiner*.

CARLTON R. CROYLE, *Examiner*.